May 17, 1938.   D. E. LEWELLEN ET AL   2,117,486
VARIABLE SPEED TRANSMISSION
Filed Feb. 24, 1936   3 Sheets-Sheet 2
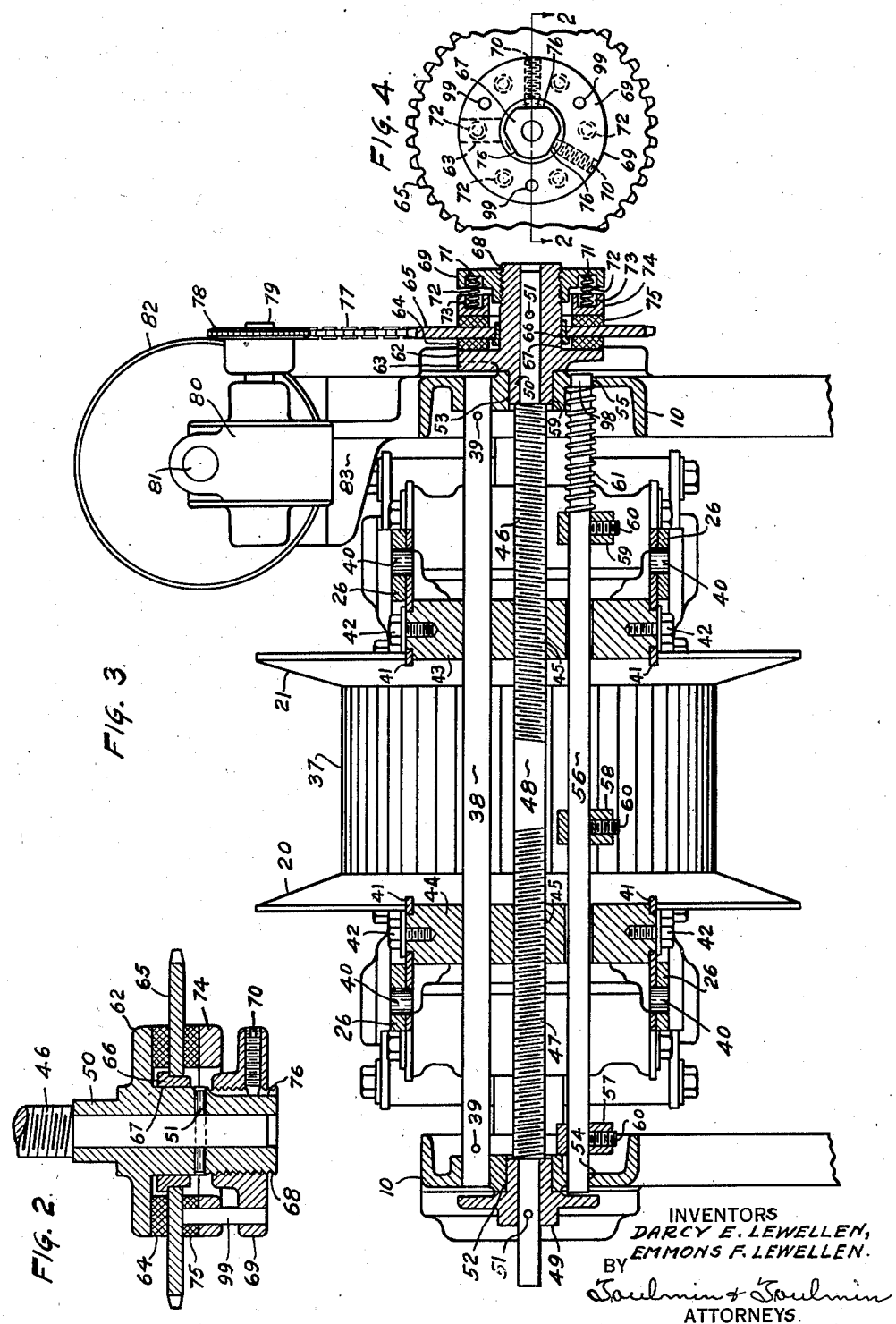
INVENTORS
DARCY E. LEWELLEN,
EMMONS F. LEWELLEN.
BY
Toulmin & Toulmin
ATTORNEYS.

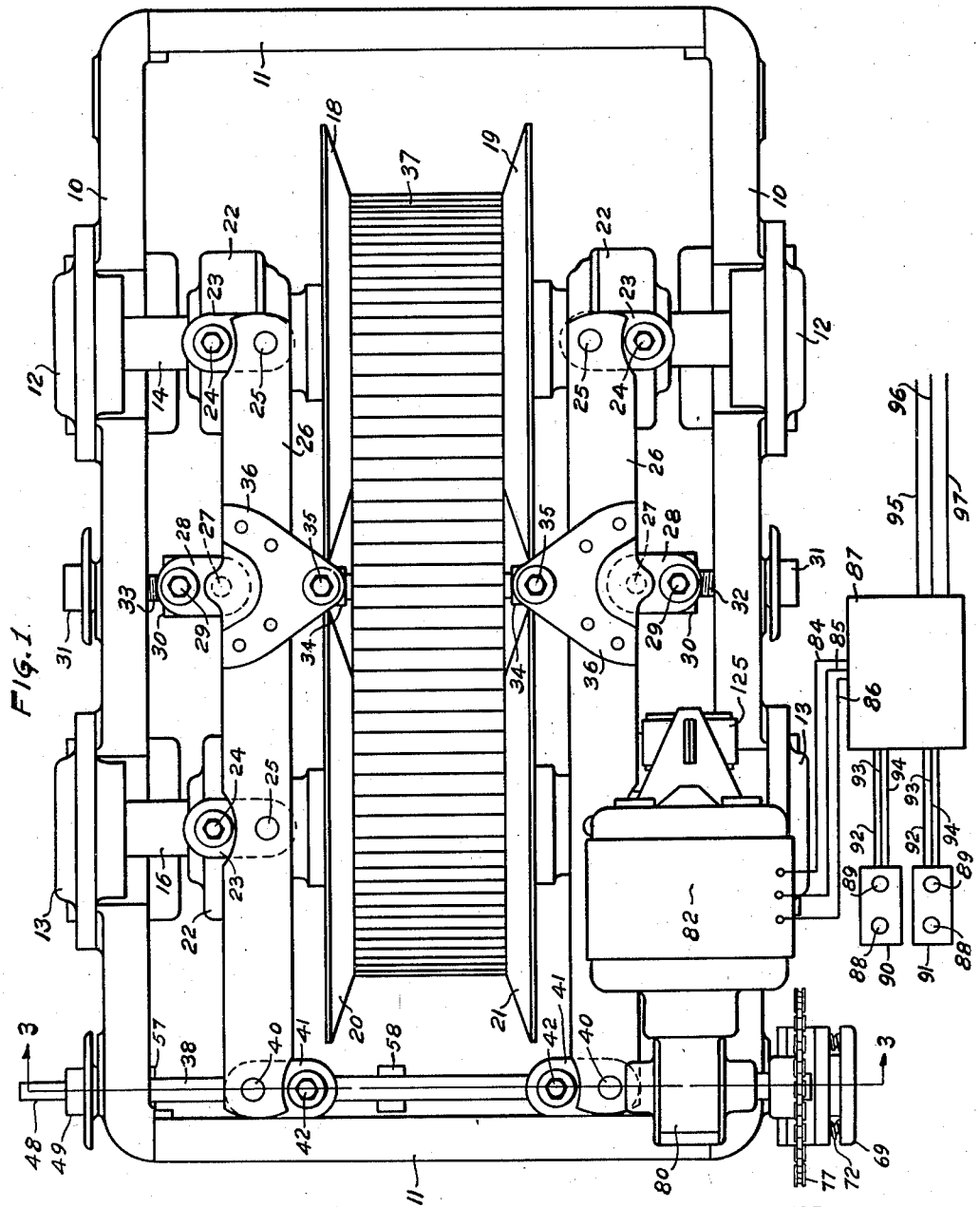

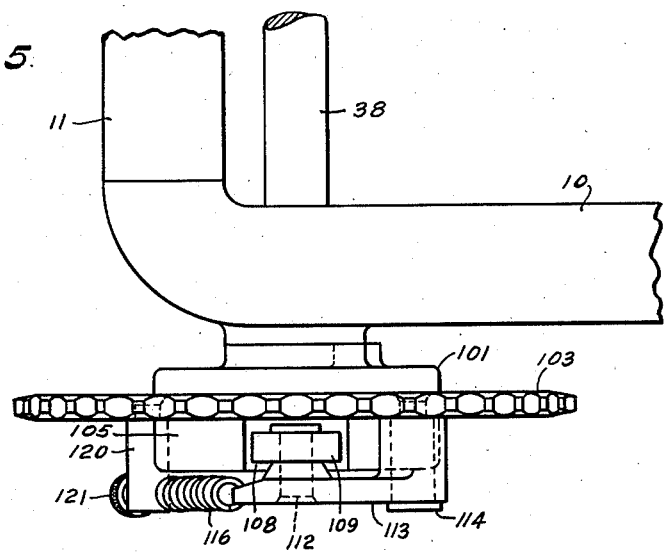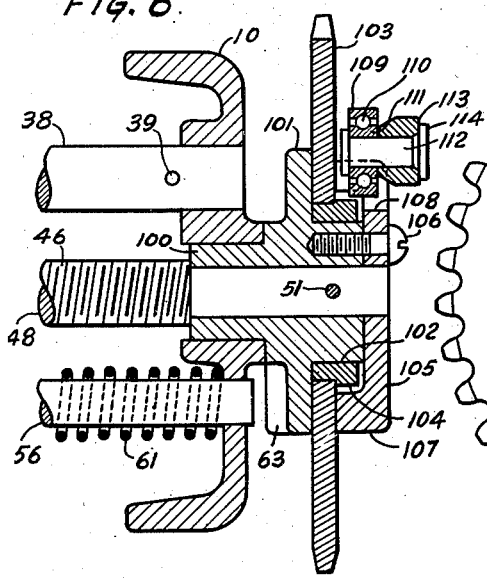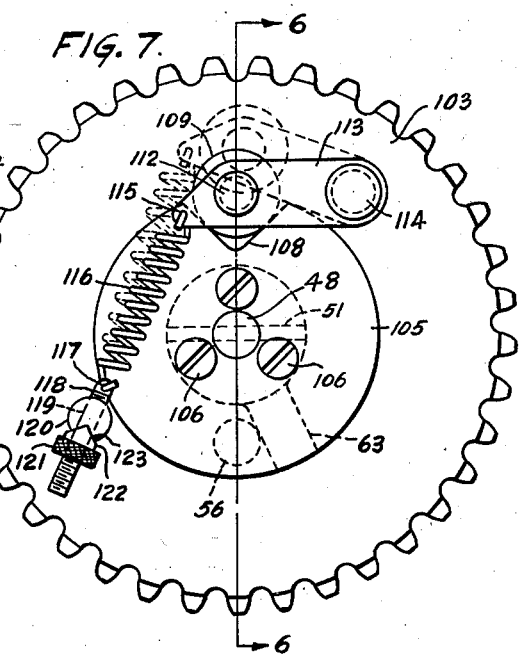

Patented May 17, 1938

2,117,486

UNITED STATES PATENT OFFICE 2,117,486

VARIABLE SPEED TRANSMISSION

Darcy E. Lewellen and Emmons F. Lewellen, Columbus, Ind.

Application February 24, 1936, Serial No. 65,287

13 Claims. (Cl. 192—141)

This invention relates to means for stopping the rotation of screw shafts at predetermined positions without jamming, and in particular, to such shafts in connection with variable speed transmissions.

One object of this invention is to provide means for halting the rotation of a screw shaft at predetermined positions, or after a predetermined number of revolutions thereof.

Another object is to provide means for halting the rotation of a screw shaft, which is capable of rotation in opposite directions and which is provided with movable nuts adapted to operate other mechanism, the halting mechanism being preferably operated when these nuts reach predetermined positions.

Another object is to provide such a screw shaft halting mechanism, in which the nuts on the screw shaft are caused to operate stops at predetermined positions on an auxiliary shaft, which in turn, operates the halting mechanism for the screw shaft.

Another object is to provide a variable speed transmission having a screw shaft with movable nuts thereon connected to the shifting mechanism of the transmission in such a manner that the motion of the nuts by the screw shaft varies the setting of the variable speed transmission, and also beyond a predetermined position operates the halting mechanism to bring the apparatus to rest without jamming the nuts or the screw shaft.

In the drawings:

Figure 1 is a top plan view of a variable speed transmission and a screw shaft for varying the setting thereof, together with means for halting the screw shaft at predetermined positions.

Figure 2 is a horizontal section along the line 2—2 of Figure 4.

Figure 3 is a vertical section through the screw shaft and its adjacent mechanism, taken along the line 3—3 in Figure 1.

Figure 4 is a fragmentary end elevation of the screw shaft operating sprocket and its associated parts, as shown in Figures 1 and 3.

Figure 5 is a fragmentary top plan view of a modified form of screw shaft sprocket and actuating mechanism.

Figure 6 is a vertical section along the line 6—6 of Figure 7.

Figure 7 is a fragmentary end elevation of the mechanism shown in Figure 5.

In general, the mechanism of this invention has for its purpose the halting of a screw shaft at predetermined limits of its rotation. Such screw shafts are frequently used for operating the controls of various mechanisms, and are frequently employed in connection with varying the settings of variable speed transmissions. Such screw shafts ordinarily carry movable nuts, to which are attached the control levers of the mechanism, and these nuts are liable to cause parts of the machine to jam in case the rotation of the screw shaft is carried too far. By the present invention the screw shaft nuts are caused to engage stops on an auxiliary shaft when the nuts arrive at their extreme limits of intended motion, whereupon the auxiliary shaft is shifted to engage and halt the screw shaft, the driving sprocket or pulley of the latter then merely rotating idly by reason of its frictional engagement with the screw shaft.

Referring to the drawings in detail, Figure 1 shows a variable speed transmission which incorporates the screw shaft and the allied mechanism of the present invention. This variable speed transmission consists of a framework having side members 10 and end members 11 interconnecting the side members 10. Journalled in bearings 12 and 13 in the side members 10 are the shafts 14 and 16 of the variable speed transmission pulley halves 18, 19, 20 and 21, respectively. These pulley halves are of conical form and are adapted to be moved toward and away from one another by means of the members 22 engaging them. For this purpose the members 22 are engaged by links 23, having pivotal connections 24 therewith. At their opposite ends the links 23 are pivotally attached, as at 25, to the shifting levers 26 of the variable speed transmission. The shifting levers 26 are pivotally connected, as at 27, to links 28, which in turn are pivoted, as at 29, to nuts 30 mounted upon a screw shaft 31 having right and left-hand threaded portions 32 and 33, respectively. The screw shaft 31 is journalled in the side members 10. It also carries a pair of yokes 34, which are pivotally connected, as at 35, to the members 36. The latter are secured, as by riveting or welding, to the shifting levers 26. The frame side members 10 are additionally interconnected in the vicinity of one of the frame end members 11 (Figures 1 and 3) by a rod 38 inserted therein and maintained in position by pins 39.

The purpose of the screw shaft 31 and its associated mechanism is to permit a variation of the fulcrums 27 of the shifting levers 26 in order to tighten or slacken the belt 37 which connects the pulley halves 20 and 21 with the pulley halves 18 and 19. When the screw shaft 31 is rotated, as by the use of a crank or wrench (not shown), the fulcrums 27 move toward or away from one another and thereby tighten or loosen the belt 37. The free ends of the shifting levers 26 are pivotally connected, as at 40, to the links 41, which in turn are pivotally mounted, as at 42, upon the nuts 43 and 44. The nuts 43 and 44 are provided with threaded bores 45 (Figure 3), which are oppositely threaded and mounted upon the oppositely threaded portions 46 and 47, respectively, of the screw shaft 48.

The screw shaft 48 is secured at its opposite ends to bushings 49 and 50, as by the pins 51. The bushing 49 is journalled, as at 52, in the left-hand side frame member 10, whereas the bushing 50 is journalled, as at 53, in the right-hand side member 10. The side members 10 are provided with bores 54 and 55, respectively, slidably supporting the opposite ends of an auxiliary shaft 56. Mounted on the auxiliary shaft 56 are movable stops 57, 58 and 59, these being adjustably secured to the shaft by means of the set screws 60. Arranged between the stop 59 and the side member 10 is the coil spring 61, which urges the auxiliary shaft 56 to the left (Figure 3) so that its stop 57 engages the inner wall of the left-hand side frame member 10.

The bushing 50, mounted upon the right hand of the screw shaft 48, is provided with a flanged portion 62 having a projecting lug 63, which is adapted to be engaged by the auxiliary shaft 56 when it is shifted to the right of the position shown in Figure 3. The flange 62 also carries a friction lining 64, which serves as a clutch facing for the frictional engagement of the drive sprocket 65. The latter is mounted upon the sleeve 66, which in turn, loosely and freely rotates upon the hub portion 67 of the bushing 50. The hub portion 67 is also provided with a threaded part 68, having a nut 69 threaded thereon and locked thereto by the set screws 70 (Figure 4).

Within the recesses 71 in the nut 69 are mounted coil springs 72. The opposite ends are mounted in similar recesses 73 of an annular plate 74. Secured to the opposite side of the plate 74 is a frictional facing 75 engaging the opposite side of the sprocket 65 from the frictional facing 64. The outer end of the hub 67 is provided with flattened portions 76 (Figure 4) which are adapted to be engaged by the inner ends of the set screws 70 so as to lock the nut 69 in a fixed position upon the threaded portion 68. When the nut 69 has been screwed inward or outward upon the threaded portion 68, the clutch facings 64 and 75 may thereby be caused to engage the opposite sides of the sprocket 65 with any desired amount of thrust. Ordinarily, therefore, the sprocket 65 will drive the bushing 50 and the screw shaft 48, but when the right-hand end of the auxiliary shaft 56 is shifted to engage the lug 63, the sprocket 65 will merely slide loosely relatively to the frictional facings 64 and 75. The nut 69 is drivingly connected to the annular plate 74 by means of the pins 99 (Figures 2 and 4).

The sprocket 65 is driven by means of the sprocket chain 77 from the drive sprocket 78, mounted upon the output shaft 79 of the reduction gear box 80, the input shaft 81 of which is connected to the drive shaft of the motor 82. The motor 82 and reduction gear box 80 are mounted upon a bracket 83 (Figure 3), secured to the right-hand side member 10. The motor 82 is connected by the lines 84, 85 and 86 to the magnetic starting switch 87, controlled by the push buttons 88 and 89 of the push button stations 90 and 91.

The push button stations 90 and 91 are electrically connected to the magnetic starting switch 87 by the lines 92, 93 and 94. The power lines 95, 96 and 97 supply power current to the magnetic starting switch 87, and this in turn, is distributed to the motor 82 by pressing the push button 88 or 89 of the push button station 90 or 91. Accordingly, the switch button stations 90 and 91 may be located remote from the variable speed transmission and enable the control therefrom a distance.

The motor 82 is of a reversible type, and may be rotated to revolve the screw shaft 48 in opposite directions. When the screw shaft 48 is rotated in one direction the nuts 43 and 44 move away from one another, thereby separating the free ends of the shifting levers 26. By this operation the pulley halves 18 and 19 are caused to approach one another, and the pulley halves 20 and 21 to separate. As a result the belt 37 engages the pulley halves 18 and 19 upon a relatively large diameter, and also engages the pulley halves 20 and 21 upon a relatively small diameter. Assuming that the shaft 16 is the driving shaft, it will be seen that under these circumstances the shaft 14 is driven at a reduced speed. The shaft 16 is, of course, adapted to be operated by an external source of power (not shown), as by another motor.

When the screw shaft 48 has rotated to such an extent that the nuts 43 and 44 have separated by a predetermined amount, the nut 43 engages the stop 59 and shifts the auxiliary shaft 56 to the right, overcoming the thrust of the coil spring 61. When this occurs the right-hand end 98 of the auxiliary shaft 56 projects from the bore 55 in the side member 10 and engages the lug 63 upon the flange 62 of the bushing 50, halting the bushing and the screw shaft 48. The sprocket 65 continues to rotate, however, because its thrust overcomes the frictional engagement of the frictional clutch facings 64 and 75.

If the screw shaft 48 is rotated in the opposite direction, so that the nuts 43 and 44 approach one another, the setting of the variable speed transmission is altered in the opposite direction. When the nuts 43 and 44 have approached one another to such an extent that the nut 44 engages the stop 58, the latter likewise shifts the auxiliary shaft 56 to the right and causes the end 98 thereof to project and again engage the lug 63, stopping the shaft in the manner previously described. Thus, the screw shaft 48 is brought to a halt when the nuts 43 and 44 approach one another or recede from one another to predetermined positions. This halting of the screw shaft 48 is accomplished without any jamming of either the nuts 43 and 44 or the screw threads 46 and 47.

*Modified driving arrangement*

The modified driving arrangement shown in Figures 5, 6 and 7 dispenses with the frictional facings 64 and 75 of Figures 2 and 3. The screw shaft 48 and auxiliary shaft 56, with their connections, remain substantially the same as in the form shown in Figures 1 and 3. The bushing 50 of Figures 1 to 4, inclusive, however, is replaced by a modified bushing 100, having a flange 101 with the lug 63, previously mentioned. The bushing 100 also has a hub portion 102 adapted to receive the drive sprocket 103 and its sleeve 104 and secured to the screw shaft 48 by the previously mentioned pin 51. An end plate 105 is secured to the bushing 100 by means of the screws 106, and is provided with an annular rim 107 which extends inwardly and engages the outer face of the sprocket 103. At one portion thereof, however, the plate 105 and its annular rim 107 are cut away to provide a notch 108 (Figure 7), adapted to receive a roller 109 which serves as the outer race of ball bearings 110, the inner race 111 of which is mounted upon a stud 112 supported by an arm 113, the opposite end of which is pivotally mounted upon the stud 114 secured to the sprocket 103. The free end of the arm 113 is provided with a hole 115, in which is anchored one end of a tension spring 116, the opposite end of which is anchored in a hole 117 in the end of a screw 118 which passes through a bore 119 in a stud 120 mounted in the sprocket 103. A nut 121, mounted on the opposite side of the screw 118 from the spring 116, serves to adjust the pull which the spring 116 exerts upon the arm 113, and the wedge-shaped portion 122 cooperates with a notch 123 in the stud 120 to lock the nut 121 in a particular position of adjustment.

In the operation of the modified driving mechanism shown in Figures 5 to 7, inclusive, so long as the nuts 43 and 44 or the screw shaft 48 are away from their extreme positions so that the auxiliary shaft 56 remains urged to the left and out of engagement with its lug 63 on the bushing 100, the sprocket 103 will drive the bushing 100 and the screw shaft 48 by means of the engagement of the roller 109 in the notch 108. When one of the nuts 43 or 44 reaches its extreme position so that it operates one of the stops 58 or 59 to shift the auxiliary shaft 56 to the right so that it engages the lug 63 and stops the rotation of the bushing 100 and the screw shaft 48, the roller 109 rises out of the notch 108 against the pull of the spring 116, and rides around the periphery of the plate 107, slipping into and out of the notch 108 once during each revolution thereof. This continues as long as the auxiliary shaft 56 remains in engagement with the lug 63. As soon as the screw shaft 48 is rotated in the reverse direction, however, the auxiliary shaft 56 is released and moves to the left, freeing the lug 63. The screw shaft 48 is then permitted to rotate freely, and is driven again by the roller 109 engaging the notch 108.

It will be understood that I desire to comprehend within my invention such modifications as come within the scope of the claims and the invention.

A brake 125 is arranged on one end of the motor shaft to halt the motor shaft and prevent coasting when the motor 82 is deenergized. The button 88 energizes the motor 82 for forward rotation, and the button 89 for reverse rotation. The brake 125 is preferably operated by an electro-magnet in the motor circuit.

Having thus fully described my invention, what we claim as new and desire to secure by Letters Patent, is:

1. In combination, a screw shaft, an auxiliary shaft, a threaded member on said screw shaft, a device on said auxiliary shaft adapted to be engaged by said threaded member when said threaded member arrives at a predetermined position, means operated by said auxiliary shaft in response to the action of said device to halt the rotation of said screw shaft and to hold said screw shaft in a halted position, and releasable means for driving said screw shaft adapted to rotate relatively thereto upon the halting thereof by said auxiliary shaft.

2. In combination, a screw shaft, an auxiliary element movable relatively to said screw shaft, a threaded member on said screw shaft, a releasable connection for driving said screw shaft, means associated with said auxiliary element for shifting said auxiliary element into engagement with said releasable connection to halt the rotation of said screw shaft and to hold said screw shaft in a halted position responsive to the arrival of said threaded member at a predetermined position thereon, said driving connection being adapted to release said screw shaft and rotate relatively thereto upon the halting of said screw shaft by said auxiliary element.

3. In combination, a screw shaft, an auxiliary shaft, a threaded member on said screw shaft, a device on said auxiliary shaft adapted to be engaged by said threaded member when said threaded member arrives at a predetermined position, means operated by said auxiliary shaft in response to the action of said device to halt the rotation of said screw shaft and to hold said screw shaft in a halted position, and means releasably connected to and driving said screw shaft, said driving means being adapted to release said screw shaft and rotate relatively thereto upon the halting thereof by said auxiliary shaft.

4. In combination, a screw shaft, an auxiliary element, a threaded member on said screw shaft, a releasable connection for driving said screw shaft, means associated with said auxiliary element for shifting said auxiliary element into engagement with said releasable connection to halt the rotation of said screw shaft and to hold said screw shaft in a halted position responsive to the arrival of said threaded member at a predetermined position thereon, said releasable connection including means adapted to release said screw shaft and rotate relatively thereto upon the halting of said screw shaft by said auxiliary element, and means for adjustably varying the engagement thrust between said driving means and said screw shaft.

5. In combination, a screw shaft having oppositely threaded portions, a threaded member on each portion, an auxiliary element movable relatively to said screw shaft and having means thereon adapted to be engaged by one of said threaded members at one of a pair of oppositely disposed limiting positions to shift said element, and means responsive to the shifting of said auxiliary element to halt the rotation of said screw shaft.

6. In combination, a screw shaft having oppositely threaded portions, a threaded member on each portion, an auxiliary element movable relatively to said screw shaft and having means thereon adapted to be engaged by one of said threaded members at one of a pair of oppositely disposed limiting positions to shift said element, means responsive to the shifting of said auxiliary element to halt the rotation of said screw shaft, and means for driving said screw shaft adapted to rotate relatively thereto beyond a predetermined resistance therebetween.

7. In combination, a screw shaft having oppositely threaded portions, a threaded member on each portion, an auxiliary element movable relatively to said screw shaft and having means thereon adapted to be engaged by one of said threaded members at one of a pair of oppositely disposed limiting positions to shift said element, means responsive to the shifting of said auxiliary element to halt the rotation of said screw shaft, and means releasably connected to and driving said screw shaft, said driving means being adapted to release said screw shaft and rotate relatively thereto upon the halting of the screw shaft by said auxiliary element.

8. In combination, a screw shaft, an auxiliary element, a threaded member on said screw shaft adapted at a predetermined position to engage and shift said auxiliary element, releasable driving means having a driving member and a driven member operatively connected to said screw shaft and engageable by said auxiliary element to halt the rotation of said screw shaft and to hold said screw shaft in a halted position responsive to the arrival of said threaded member at said predetermined position thereon, said driven member being connected to said screw shaft and said driving member being releasably engageable and adapted to disengage said driven member in response to the attainment of a predetermined torque.

9. In combination, a screw shaft, an auxiliary element, a threaded member on said screw shaft adapted at a predetermined position to engage and shift said auxiliary element, releasable driving means having a driving member and a driven member operatively connected to said screw shaft and engageable by said auxiliary element to halt the rotation of said screw shaft and to hold said screwshaft in a halted position responsive to the arrival of said threaded member at said predetermined position thereon, said driven member being connected to said screw shaft and said driving member being releasably engageable and adapted to disengage said driven member in response to the attainment of a predetermined torque and to rotate relatively thereto upon the halting of said screw shaft in response to the operation of said auxiliary element.

10. In combination, a screw shaft, an auxiliary element, threaded means on said shaft adapted to move longitudinally in response to the rotation of said shaft, means associated with said auxiliary element engageable by said threaded means on said screw shaft for shifting said auxiliary element in response to the arrival of said threaded means at a pair of predetermined positions at opposite limits of the motion thereof, a frictional member operatively connected to said screw shaft and having means adapted to be engaged and held in a halted position by said auxiliary element in its shifted position, and a driving element adapted to drivingly engage said frictional member and to rotate relatively thereto upon the halting of said screw shaft in response to the engagement of said frictional member by said auxiliary element in its shifted position.

11. In combination, a screw shaft, an auxiliary element, threaded means on said shaft adapted to move longitudinally in response to the rotation of said shaft, means associated with said auxiliary element adapted to be engaged by said threaded means at a pair of oppositely disposed limiting positions to shift said element and halt the rotation of said screw shaft, a frictional member operatively connected to said screw shaft and having means adapted to be engaged and held in a halted position by said auxiliary element in its shifted position, and a driving element adapted to drivingly engage said frictional member and to rotate relatively thereto upon the halting of said screw shaft in response to the engagement of said frictional member by said auxiliary element in its shifted position.

12. In combination, a screw shaft, an auxiliary element, a threaded nut on said screw shaft adapted to engage and shift said auxiliary element in response to the arrival of said nut at a predetermined position, a driving member, and a driven member operatively connected to said screw shaft and arranged to be engaged and held in a halted position by said shifted auxiliary element, one of said members having a recess therein and the other of said members having a yieldingly urged element adapted to yieldably engage said recess and drive said driven member.

13. In combination, a screw shaft, an auxiliary element, a threaded nut on said screw shaft adapted to engage and shift said auxiliary element in response to the arrival of said nut at a predetermined position, a driving member, and a driven member operatively connected to said screw shaft, one of said members having a recess therein and the other of said members having a yieldingly urged element adapted to yieldably engage said recess and drive said driven member, said auxiliary element being arranged to engage and halt one of said members in response to the shifting of said auxiliary element by said threaded nut, and said yieldingly urged element being adapted to move out of said recess upon the halting of one of said members and permit the other of said members to rotate relatively thereto.

DARCY E. LEWELLEN.
EMMONS F. LEWELLEN.